United States Patent Office 3,459,674
Patented Aug. 5, 1969

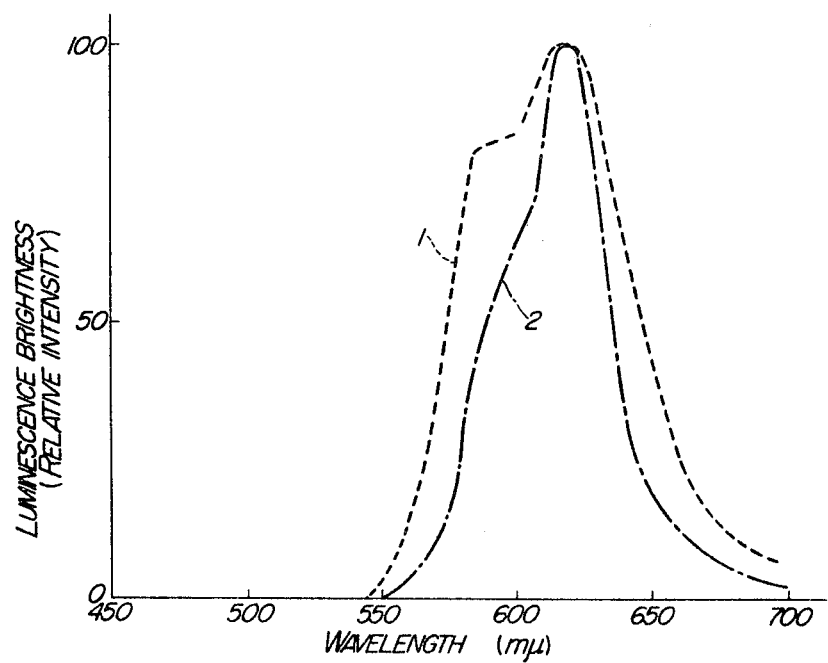

3,459,674
PHOSPHORS
Masayuki Emoto, Kodaira-shi, and Masahiro Nakano,
Hachioji-shi, Japan, assignors to Hitachi, Ltd., Tokyo,
Japan, a corporation of Japan
Continuation-in-part of application Ser. No. 520,765,
Jan. 14, 1966. This application Sept. 30, 1968, Ser.
No. 763,607
Claims priority, application Japan, Jan. 20, 1965,
40/2,575
Int. Cl. C09k 1/10
U.S. Cl. 252—301.6                                    9 Claims

ABSTRACT OF THE DISCLOSURE

Phosphor compositions most suitable for a color television or high-pressure mercury lamps consists of at least one member selected from the group consisting of calcium, strontium, barium, magnesium and zinc as cations; a tantalate as anions; and in addition at least one rare earth element selected from the group consisting of europium, samarium and terbium, or of such phosphor compositions with further addition of lithium. The phosphor compositions possess characteristics which are body-colorless and exceed in color purity and temperature dependence.

This application is a continuation-in-part of our pending application Ser. No. 520,765 filed Jan. 14, 1966, now abandoned.

This invention relates to phosphors consisting of a multioxide and has for its object to provide a phosphor which when excited by radiation or charged particles exhibits luminescence in color ranging from whitish green to red, and more particularly a phosphor of the character described which is body-colorless and exceeds in color purity and temperature dependence.

Magnesium germanate as a red phosphor has heretofore been used in color rendering of high-pressure mercury lamps, but it has a body color and is not satisfactory in temperature dependence. Sulfide red phosphors, conventionally used in color television, also are unsatisfactory in temperature dependence and have a broad luminescence spectrum width and hence a poor color purity.

The present invention is intended to obviate these deficiencies and accordingly provides a novel phosphor which comprises essentially of at least one member selected from the group consisting of calcium, strontium, barium, magnesium and zinc as cations; a tantalate as anions; and in addition at least one rare earth element selected from the group consisting of europium, samarium and terbium as an activator.

The base of such multioxide phosphor is formed by firing a mixture of at least one member selected from the group consisting of calcium, strontium, barium, magnesium and zinc carbonates; and a tantalum oxide. The same result can also be obtained by employing, instead of the carbonate and oxide, corresponding oxalate and hydroxide which are convertible to oxides during the firing process.

Extensive researches conducted by the inventors have revealed that most satisfactory results can be obtained by firing a mixture of 2.0 to 3.0 mols of at least one selected from the group consisting of calcium, strontium, barium, magnesium and zinc oxides or compounds thereof which are convertible to the oxides by firing; 1.0 mol tantalum oxide ($Ta_2O_5$) or compound thereof which is convertible to oxide by firing; and 0.03 to 0.1 mol of at least one rare earth element oxide or compound thereof which is convertible to oxide by firing, selected from the group consisting of europium, samarium and terbium.

Further, an addition of 0.01 to 0.5 mol lithium chloride into the mixture produces good results when the mixture is fired. That is, the addition has the effects of promoting the firing and of retaining all amount of activator without loss in the final fired body.

The phosphor thus obtained exhibits luminescence whitish-green or red in color when excited by a radiation of an appropriate wavelength or charged particles of an appropriate energy level. Also, the luminescence emittivity of the phosphor is substantially increased where the prefiring or full-firing of the mixture is performed in an oxygen stream.

Some practical examples of the present invention will next be described. The accompanying drawing illustrates spectral characteristics of different phosphors prepared according to the present invention.

Example 1

A mixture of 2.0 mols of calcium carbonate, 1.0 mol of tantalum oxide and 0.05 mol of europium oxide is prefired at a temperature between 500° C. and 1000° C. and subsequently is fully pulverized to mix. The resulting powder is refired at 1200° C. for two hours to obtain a phosphor having a composition of $Ca_2Ta_2O_7$:Eu. This phosphor exhibits reddish-orange luminescence and has a spectral characteristic as represented by the curve 1 in the drawing.

Example 2

A mixture of 3.0 mols of calcium carbonate, 1.0 mol of tantalum oxide and 0.05 mol of europium oxide is prefired at a temperature between 500° C. and 900° C. for two hours and subsequently is thoroughly pulverized to mix. The powder is then refired at 1100° C. for two hours to obtain a phosphor having a composition of $$Ca_3(TaO_4)_2:Eu$$

This phosphor exhibits reddish-orange luminescence and has a spectral characteristic as represented by the curve 2 in the drawing.

Example 3

A mixture of 3.0 mols of barium carbonate, 1.0 mol of tantalum oxide and 0.05 mol of europium oxide is prefired at 700° C. for two hours and subsequently is thoroughly pulverized to mix. The resulting powder is fired at 1200 ° C. for two hours to obtain a phosphor having a composition of $Ba_3(TaO_4)_2$:Eu, which exhibits red luminescence.

Example 4

A mixtue of 2.8 mols of strontium carbonate, 0.2 mol of barium carbonate, 1.0 mol of tantalum oxide and 0.05 mol of europium oxide is prefired at a temperature between 500° C. and 700° C. for two hours and subsequently is fully pulverized to mix. The resulting powder is fired at a temperature between 900° C. and 1000° C. for two hours to obtain a phosphor having a composition of $(Sr_{1.4}Ba_{0.1})_2(TaO_4)_2$:Eu, which exhibits red luminescence.

Example 5

A mixture of 2.0 mols of strontium carbonate, 1.0 mol of tantalum oxide and 0.06 mole of europium oxide is prefired at a temperature between 500° C. and 700° C. and then is fully pulverized to mix. The powder obtained is fired at a temperature between 1000° C. and 1100° C. for two hours to obtain a phosphor having a composition of $Sr_2Ta_2O_7$:Eu, which exhibits red luminescence.

Example 6

A mixture of 2.0 mols of magnesium carbonate, 1.0 mol of tantalum oxide and 0.05 mol of terbium oxide prefired at 700° C. for two hours and is then fully pulverized to mix. This powder is fired at 1200° C. for two hours to obtain a phosphor having a composition of $$Mg_2Ta_2O_7:Tb$$

This phosphor exhibits green luminescence.

Example 7

A mixture of 3.0 mols of zinc carbonate, 1.0 mol of tantalum oxide and 0.05 mol of europium oxide is prefired at 700° C. for two hours and is then fully pulverized to mix. This powder is fired at 1200° C. for two hours to obtain a phosphor having a composition of $Zn_3(TaO_4)_2:Eu$, which exhibits bluish-white luminesence.

Example 8

A mixture of 2.0 mols of calcium carbonate, 1.0 mol of tantalum oxide and 0.05 mol of terbium oxide is prefired at a temperature between 500° C. and 800° C. for two hours and subsequently is thoroughly pulverized to mix. The resulting powder is refired at a temperature between 1000° C. and 1100° C. to obtain a phosphor having a composition of $Ca_2Ta_2O_7:Tb$. This phosphor exhibits green luminescence.

Example 9

A mixture of 3.0 mols of calcium oxalate, 1.0 mol of tantalum oxide and 0.05 mol of samarium oxide is prefired in oxygen at a temperature between 500° C. and 800° C. for two hours and thereafter is fully pulverized to mix. The powder thus obtained is fired at a temperature between 1000° C. and 1100° C. for two hours to obtain a phosphor having a composition of $$Ca_3(TaO_4)_2:Sm$$

which exhibits red luminescence.

Example 10

A mixture of 2.8 mols of calcium carbonate, 0.2 mol of barium carbonate, 1.0 mol of tantalum oxide, 0.05 mol of europium oxide and 0.15 mol of lithium chloride is prefired in an oxygen stream at a temperature between 500° C. and 700° C. for two hours and subsequently is fully pulverized to mix. The resulting powder is refired at 900° C. for 2 hours to obtain a phosphor having a composition of $(Ca_{1.4}Ba_{0.1})_2(TaO_4)_2:Eu$, Li, which exhibits red luminescence.

Example 11

A mixture of 1.0 mol of calcium carbonate, 1.0 mol of strontium carbonate, 1.0 mol of tantalum oxide, 0.03 mol of europium oxide and 0.02 mol of samarium oxide is prefixed in an oxygen stream at a temperature between 800° C. and 900° C. for two hours. The phosphor thus obtained has a composition of $(Ca_{0.5}Sr_{0.5})_2Ta_2O_7:Eu$, Sm and exhibits red luminescence.

The same result is obtainable by employing, in place of the oxalate, a corresponding hydroxide or other substance which is transformable into an oxide by firing.

In the above examples, luminescence emission can be caused by use of any appropriate radiation or bombardment of charged particles and, among others, it has been found that use of radiation of 2537 A. wavelength is most effective.

It will be noted from the foregoing description that the multioxide phosphors according to the present invention have four different emission bands under the excitation effect of radiation and charged particles and that those having a sharp peak in the red region have no body color in contrast to conventional red phosphors such as magnesium germanate which is yellow in body color, and are subject to no substantial deterioration in the temperature range of up to approximately 200° C. in contrast to conventional sulfide phosphors, which rapidly deteriorate at temperatures exceeding 60° C. Such excellent temperature dependence of luminescence makes the inventive phosphors particularly valuable for use in color-rendering of high-pressure mercury lamps. Also, the inventive phosphors can be used to advantage as a red phosphor for color television use because of their high color purity obtained with their limited luminescence spectrum width of approximately 100 A. contrasted to that of sulfide phosphors such as Zn=CdS:Ag approximating 950 A.

What is claimed is:

1. A phosphor consisting essentially of at least one member selected from the group consisting of calcium, strontium, barium, magnesium and zinc as cations; a tantalate radical as anions; and in addition at least one rare earth element selected from the group consisting of europium, samarium and terbium as an activator.

2. A phosphor consisting essentially of a multioxide formed by firing a mixture of 2.0 to 3.0 mols of at least one member selected from the group consisting of calcium, strontium, barium, magnesium and zinc oxides or compounds which are convertible to the oxides by firing; 1.0 mol tantalum oxide or compound which is convertible to the oxide by firing; and 0.03 to 0.1 mol of at least one rare earth oxide or compound which is convertible to the oxide by firing, selected from the group consisting of europium, samarium and terbium.

3. The phosphor as claimed in claim 2, in which said mixture is prefired and/or full-fired in an oxygen stream.

4. A phosphor consisting of a multioxide formed by firing a mixture of 2.0 to 3.0 mols of at least one member selected from the group consisting of calcium, strontium, barium, magnesium and zinc oxides or compounds which are convertible to the oxides by firing; 1.0 mol tantalum oxide or compound which is convertible to the oxide by firing; 0.03 to 0.1 mol of at least one rare earth oxide or compound which is convertible to the oxide by firing, selected from the group consisting of europium, samarium and terbium; and 0.1 to 0.5 mol lithium chloride.

5. The phosphor as claimed in claim 4, in which said mixture is prefixed and/or full-fired in an oxygen stream.

6. A phosphor composition having a formula
$$Ca_2Ta_2O_7:Eu$$
7. A phosphor composition having a formula
$$Ca_3(TaO_4)_2:Eu$$
8. A phosphor composition having a formula
$$Ba_3(TaO_4)_2:Eu$$
9. A phosphor composition having a formula
$$Zn_3(TaO_4)_2:Eu$$

References Cited

UNITED STATES PATENTS 3,338,841   8/1967   Brixner _____ 252—301.4

OTHER REFERENCES

Wachtel: Self-Activated Luminescence of $M^{2+}$ Niobates and Tantalates, Journal of Electro Chemical Society, vol. III, No. 5, May 1964, pp. 534–538.

TOBIAS E. LEVOW, Primary Examiner

R. D. EDMONDS, Assistant Examiner

U.S. Cl. X.R

252—301